US 6,604,208 B1

(12) United States Patent
Gosselin et al.

(10) Patent No.: US 6,604,208 B1
(45) Date of Patent: Aug. 5, 2003

(54) INCREMENTAL ALARM CORRELATION METHOD AND APPARATUS

(75) Inventors: Nicolas Gosselin, Blainville (CA); Edwin Tse, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/545,541

(22) Filed: Apr. 7, 2000

(51) Int. Cl.[7] .................................................. G06F 11/30
(52) U.S. Cl. .............................. 714/4; 714/25; 714/43; 714/47; 714/48
(58) Field of Search ............................. 714/4, 25, 48, 714/43, 47

(56) References Cited

U.S. PATENT DOCUMENTS

| 5,309,448 | A | | 5/1994 | Bouloutas et al. ........... 371/291 |
|---|---|---|---|---|
| 5,428,619 | A | * | 6/1995 | Schwartz et al. ............ 714/712 |
| 5,473,596 | A | | 12/1995 | Garafola et al. .............. 370/43 |
| 5,539,877 | A | * | 7/1996 | Winokur et al. .............. 714/48 |
| 5,646,864 | A | | 7/1997 | Whitney .................. 364/514 B |
| 5,737,319 | A | * | 4/1998 | Croslin et al. ................ 714/48 |
| 5,748,098 | A | * | 5/1998 | Grace ......................... 370/242 |
| 5,768,501 | A | | 6/1998 | Lewis .................... 395/185.01 |
| 5,872,911 | A | | 2/1999 | Berg ....................... 395/183.19 |
| 5,968,122 | A | * | 10/1999 | Schlosser et al. ........... 709/223 |
| 6,000,045 | A | | 12/1999 | Lewis ........................... 714/47 |
| 6,006,016 | A | * | 12/1999 | Faigon et al. ................ 714/48 |
| 6,253,339 | B1 | * | 6/2001 | Tse et al. ....................... 714/47 |
| 6,353,902 | B1 | * | 3/2002 | Kulatunge et al. ............ 714/47 |
| 6,373,383 | B1 | * | 4/2002 | Arrowsmith et al. ....... 340/506 |

FOREIGN PATENT DOCUMENTS

| GB | 2318497 A | 10/1996 |
|---|---|---|
| JP | 98257054 | 9/1998 |

OTHER PUBLICATIONS

S. Kätker, et al. "Fault Isolation and Event Correlation for Integrated Fault Management," Part III, Fault Management I, pp. 583–595.

* cited by examiner

*Primary Examiner*—Robert Beausoliel
*Assistant Examiner*—Michael Maskulinski
(74) *Attorney, Agent, or Firm*—Jenkens & Gilchrist, PC

(57) ABSTRACT

Alarms are processed in view of an historical context to determine instances of correlation such that alarms are partitioned into correlation sets where the alarms within one set have a high probability of being caused by the same network fault. As each new alarm is received, a check is made to se whether a managed object originating that alarm is a member of a previous set and is already in an alarmed state. If so, the alarm is added to that managed object. If not, a set is built containing that alarmed managed object and its related managed objects as determined from consideration of alarm propagation rules and network topology. That set is then compared with previously built sets to determine the existence of any correlation as measured by whether the sets share managed objects in common or satisfy some other correlation test. When such correlation is found, the sets are merged together to form a larger set relating to the same network fault.

12 Claims, 2 Drawing Sheets

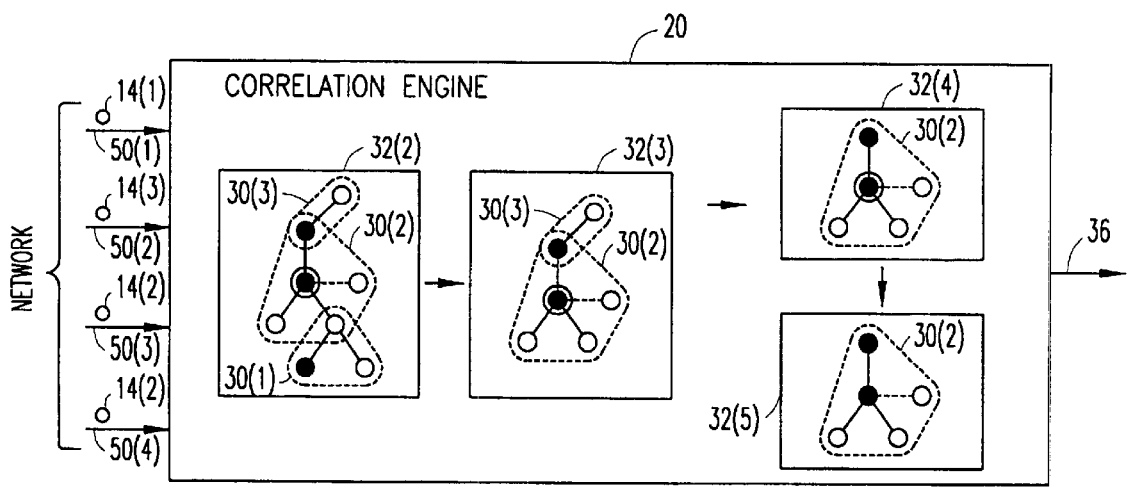
FIG. 2
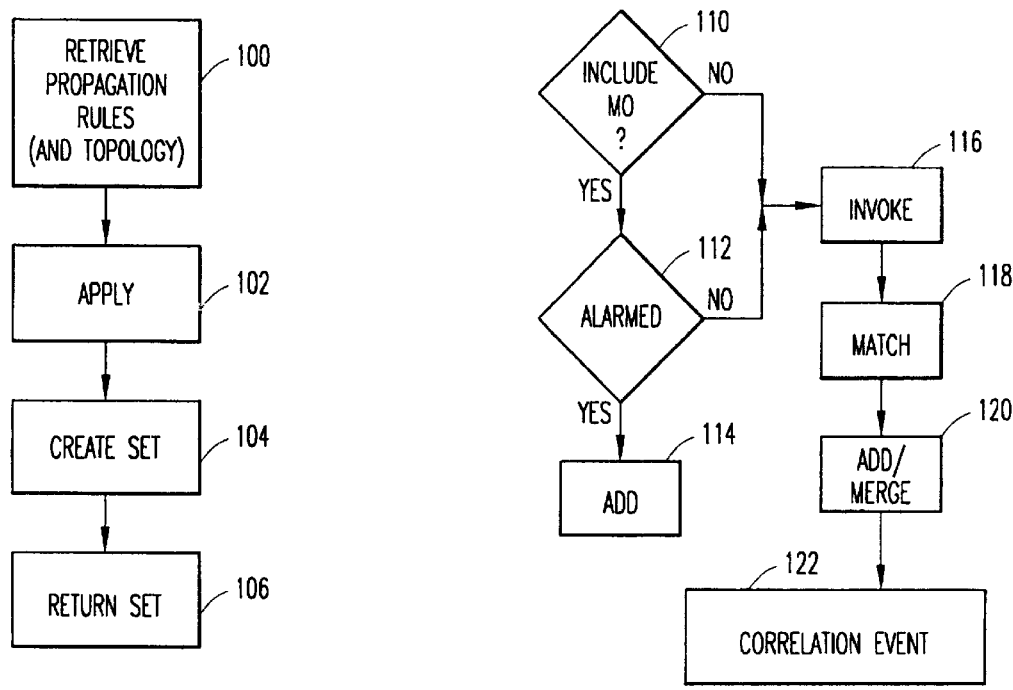
FIG. 3
FIG. 4
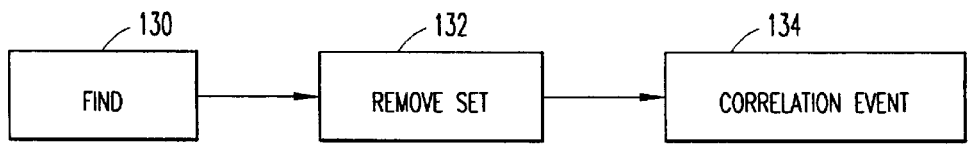
FIG. 5

INCREMENTAL ALARM CORRELATION METHOD AND APPARATUS

CROSS-REFERENCE TO RELATED APPLICATIONS

The present application is related to previously filed, co-pending and commonly owned, application for patent Ser. No. 09/181,583 entitled "Alarm Correlation in a Large Communications Network," by Edwin Tse, et al., filed Oct. 28, 1998, the disclosure of which is incorporated herein by reference.

BACKGROUND OF THE INVENTION

1. Technical Field of the Invention

The present invention relates to fault management systems and, in particular, to a method and apparatus for correlating alarms generated by network elements within a given network comprising, for example, a telecommunications or data network.

1. Description of Related Art

In a network, such as a telecommunications or data network, a single fault within or concerning the network may generate multiple alarms from network elements over space and time. It is imperative that the network operator be able to evaluate these alarms to determine the cause of the fault. This procedure involves first correlating the alarms to together by recognizing that the plural alarms are caused by the same network fault. Once the fault is isolated in this manner, the corresponding cause may be addressed and corrected. In a large network, where simultaneously occurring faults may exist, and when a storm of network element alarms may be generated, the correlation operation is much more complex and it becomes more difficult for the network operator to partition the plural alarms into associations relating to individual faults. What is needed is an apparatus and method for assisting the network operator with this correlation process when dealing with multiple alarms that arise from unrelated network faults.

Network elements are organized in a number of topologies. Hierarchical arrangement, for example, is prevalent in real networks. Examples that can be captured by such arrangements are the digital hierarchy of a transmission network, network and sub-network relations and network resource name conventions. It would be an advantage if the apparatus and method for correlating alarms could take advantage of such hierarchical and topological information concerning the managed network to assist in and speed the correlation process.

Alarms occurring in network elements placed at lower levels of the hierarchy tend to propagate to higher level network elements. In some instances, network operators recognize that certain types of alarms resulting from a given fault tend to propagate from element to element through the network in a certain manner (perhaps having some relation to hierarchy or topology). It would be an advantage if the apparatus and method for correlating alarms could take advantage of such propagation characteristics to assist in and speed the correlation process.

More generally, there is a need for an apparatus and method for correlating alarms in a managed network that is capable of near real-time correlation of a large number of simultaneous alarms with reduced time and computational resources.

SUMMARY OF THE INVENTION

An historical context is maintained containing sets previously built for previously received alarms. Each set therein contains not only a network element in an alarmed state but also network elements related to that network element by alarm propagation considerations and prior correlations. When a current alarm from a certain network element is received, a new set is built for that current alarm containing not only that certain network element but also other network elements related thereto by alarm propagation considerations. The new set is then merged with one of the previously built sets in the historical context if there exists a likelihood that the current alarm and the previously received alarm are caused by the same network fault. In one preferred embodiment, a likelihood is deemed to exist when a network element is shared in common between the new set for the current alarm and a previously built set relating to a previously received alarm. In a more generic implementation, any suitable merger test could be defined, perhaps by a network operator, and used to measure correlation.

BRIEF DESCRIPTION OF THE DRAWINGS

A more complete understanding of the method and apparatus of the present invention may be acquired by reference to the following Detailed Description when taken in conjunction with the accompanying Drawings wherein:

FIG. 2 is a block diagram of a correlation engine of the present invention including an illustration of an exemplary execution of a correlation process with respect to multiple subsequent delete alarm indications;

FIG. 3 is a flow diagram illustrating a build set method for correlation processing;

FIG. 4 is a flow diagram illustrating a new alarm indication processing method for correlation processing; and FIG. 5 is a flow diagram illustrating a delete alarm indication processing method for correlation processing.

DETAILED DESCRIPTION OF THE DRAWINGS

Figure 1:
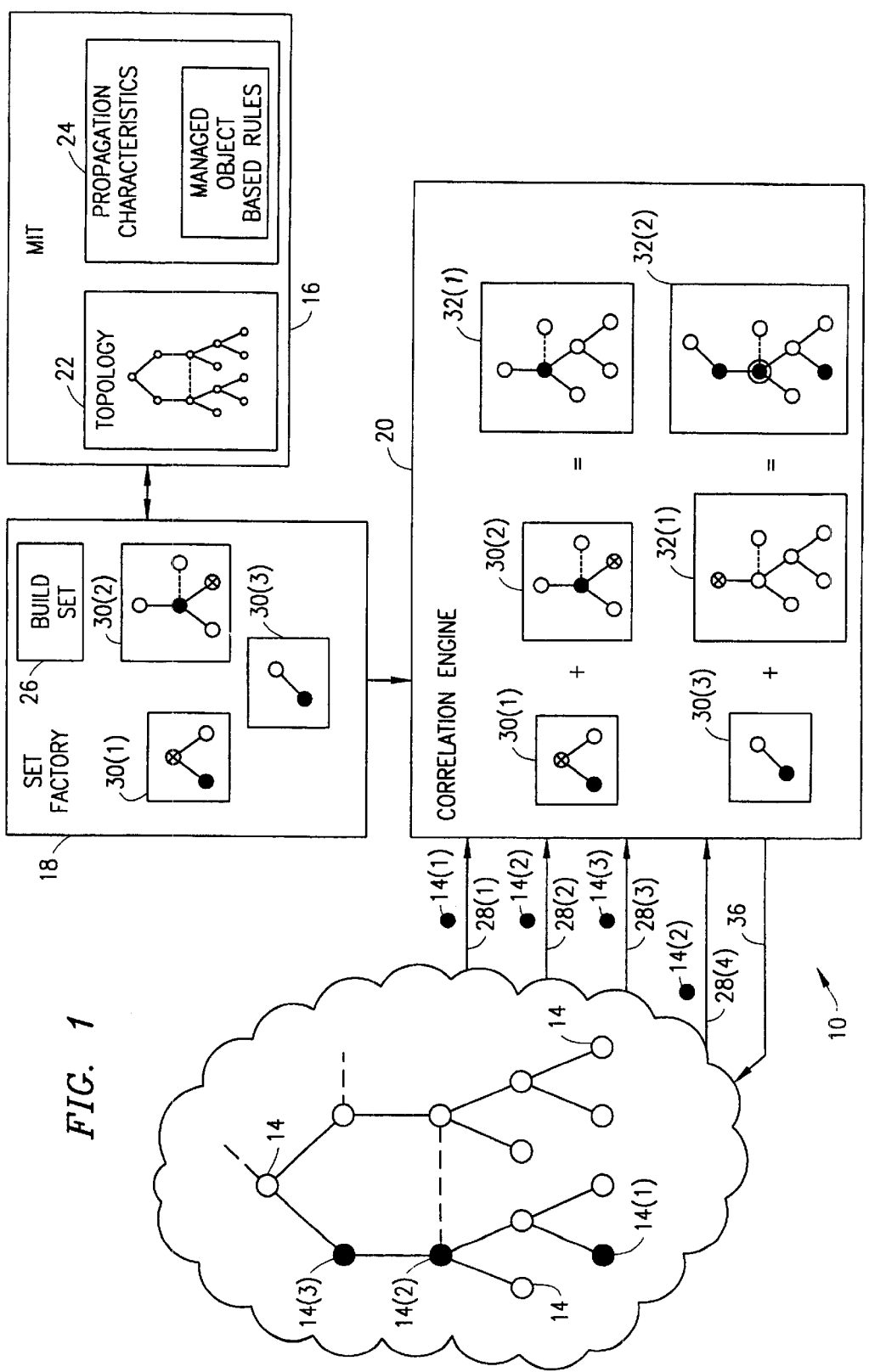
FIG. 1 is a block diagram of a correlation system of the present invention including an illustration of an exemplary execution of a correlation process with respect to multiple new alarm indications.

Reference is now made to FIG. 1 wherein there is shown a block diagram of a correlation system 10 of the present invention that assists with fault management of a network 12. In order to ease the understanding of the present invention, an exemplary, simplified network 12 (such as a telecommunications network or a data network) is illustrated, and reference will be made to that exemplary network to explain system and method of operation for correlation within a given contextual framework. The present invention, however, is not limited to fault management of only the illustrated network. The network 12 includes a plurality of network elements 14. These network elements 14 are interconnected in a certain manner to define a topology (that in many real networks comprises a hierarchical arrangement).

Faults may occur within the network 12. When such a fault occurs, one or more network elements 14 may issue an alarm. It is convenient to refer to each of the network elements 14 as managed objects for purposes of implementing the correlation system 10 for fault management. In this regard, when a fault occurs and a network element 14 issues an alarm, the managed object representing or corresponding to a particular network element is placed into an alarmed state. Operations and processes (to be discussed in more detail herein) may then be performed on or in relation to the managed objects for the purpose of correlating the alarms.

Once correlated, it becomes a much easier task for the network operator to manage the detected faults within the network.

The correlation system 10 includes a managed information tree (MIT) repository 16, a set factory 18 and a correlation engine 20. The managed information tree repository 16 stores information relating to the managed network 12. This stored information may comprise, for example, topology information 22 describing the constituents and interconnections (hierarchy) of the network 12. This topological information describes not only what network elements (i.e., managed objects) make up the network, but also the interconnection relationship between all of those network elements 14. The stored information may also comprise, for example, alarm propagation characteristics 24 concerning how alarms relating to a single fault tend to propagate among and between the network elements 14. More specifically, each managed object (i.e., network element 14) is attributed with certain alarm propagation rules that define relationships between the network elements and are useful (as will be described) in identifying those network elements (i.e., related elements) that are most likely to become alarmed or affected by an alarmed state of another network element. Depending on how these propagation rules are defined in the managed information tree repository 16, reference may need to be made to the stored topological information to collect the appropriate network elements in accordance with the propagation rules. Preferably, topological and hierarchical information is taken into consideration when defining the rules. The stored information is maintained in the managed information tree repository 16 through an implementation using a directory service such as a lightweight directory access protocol (LDAP). Knowledge of this stored information maintained in the managed information tree repository 16 assists the correlation system 10 in more accurately and quickly correlating alarms.

The set factory 18 provides a build set method 26 that when invoked in response to an alarm requests from the alarm propagation characteristics 24 stored in the managed information tree repository 16 the specifically defined propagation rules for the managed object (network element 14) in an alarmed state, along with the network topology 22 information (if needed) relating to that network element in an alarmed state. The build set method then applies the propagation rules (in view of the topology, if necessary) to identify related objects to that alarmed managed object. These managed objects are then collected together by the method in a set 30.

The correlation engine 20, in general, manages the correlation operation for the system 10. More specifically, it receives the network element 12 alarms 28 from the network 12 and invokes the build set method 26 of the set factory 18 in response to certain ones of those received alarms. The correlation engine 20 then receives the set 30 built by the set factory 18 in response to that alarm 28, and attempts to correlate that currently received set with other previously received sets. This correlation action identifies whether any of the managed objects within the currently received set 30 are shared in common with a previously received (and processed) set. Alternatively, the test for correlation could be defined in accordance with some other rules, perhaps specified by the network operator. If so, the sets are merged together to form a correlation set 32 (also referred to as a cluster). In this way, the alarms (i.e., the alarmed state managed objects) are correlated together, with their related unalarmed managed objects, into correlation sets 32 such that the alarms 28 in one correlation set have a relatively high probability (based on propagation characteristics and topology as well as historical context provided by previously generated sets 30 and correlation sets) that they are caused by the same network fault. This further acts to update the historical context in anticipation of processing the next alarm. As an implementation preference, each received set 30 may be inserted directly into a correlation set (cluster) 32 upon receipt from the set factory, with the process instead operating to merge two correlation sets having commonly owned managed objects into a single, large correlation set (and thus also update the historical context). Responsive thereto, the correlation engine 20 issues a correlation event 36 that identifies the change in the alarm context for the network 12 which results from the achieved correlation.

It is important that the correlation process be implemented in as efficient a manner as possible. To this end, historical context is considered during each correlation attempt responsive to receipt of a new alarm. One aspect of this historical context consideration was previously described where the correlation engine operates to merge a new set 30 for a most recently received alarm 28 with a previously received set 30 relating to a past alarm to update the historical context. Another aspect of this historical context consideration involves correlation engine operation to update the historical context by merging a new set 30 (or correlation set 32) with a previously generated correlation set 32 (or cluster) relating to one or more past correlated alarms. Notably, the process here for set/cluster merging is identical that previously described for set/set merging in that the correlation engine looks for managed objects held in common between the new set (or cluster) and the prior correlation sets (clusters). Again, the merger test could instead be defined by other rules that are perhaps network operator specified. Yet another aspect of this historical context consideration evaluates, when each new alarm 28 is received and prior to invoking the build set method, the content of existing sets 30 and correlation sets 32. If the new alarm 28 relates to a managed object that is already a member of a set 30 or correlation set 32, and that member managed object is already noted as being in an alarmed state, then the new alarm is simply added to the historical context of that managed object in its existing set or cluster, but no further correlation engine processing is performed. This limits the number of times that the build set method 26 is invoked by presuming that a new alarm from a previously alarmed managed object relates to the same fault. By adding the alarm, the system further keeps a historical record of the number of alarms received for any one given managed object and forces a corresponding delete alarm to be received for each previously stored alarm before a set or correlation set (cluster) containing the given managed object is destroyed.

The operation of the correlation system 10 may be better understood by reference to a specific example utilizing the contextual framework of the exemplary network 12 illustrated in FIG. 1 to handle a plurality of new alarm indications. Due to a fault in the network 12, a first network element 14(1) issues an alarm 28(1) and the corresponding managed object for that network element is placed in an alarmed state (as indicated by the solid dot) Responsive to that alarm 28(1), the correlation engine 20 notes that it has no prior sets 30 or correlation sets 32 that contain this managed object and invokes the build set method 26 of the set factory 18. The method 26 makes a request to the managed information tree repository 16 for the managed object based propagation rules as stored in the alarm propagation characteristics 24. A request may also be made, if necessary, for the stored network topology 22 information. The build set method 26 then applies the propagation rules (in view of the topology, if necessary) for that managed object in an alarmed state (network element 14(1)) to identify related objects to that alarmed managed object. These managed objects are then collected together by the build set method in a set 30(1). The set 30(1) is then returned to the correlation engine 20 where an attempt is made to correlate that currently received set with other previously received sets (or correlation sets) In the present situation, it is assumed that no such previously received sets (or correlation sets) are either present or have a managed object that is shared in common (or meet some other merger test). A correlation event 34 reporting the set 30(1) is then issued. Again, it is recognized that this set 30(1) may be inserted, if desired, directly into a correlation set 32 in which case the correlation operation attempts to merge that correlation set with existing correlation sets.

Next, a second network element 14(2) issues an alarm 28(2) and the corresponding managed object for that network element is placed in an alarmed state (as indicated by the solid dot). Responsive to that alarm 28(2), the correlation engine 20 first checks to see if the managed object for the alarm 28(2) is a member of any existing sets 30 or correlation sets 32, and further if the member managed object is already in an alarmed state. If not (as is the case here), the correlation engine 20 invokes the build set method 26 of the set factory 18. The method 26 makes a request to the managed information tree repository 16 for the managed object based propagation rules as stored in the alarm propagation characteristics 24. A request may also be made, if necessary, for the stored network topology 22 information. The build set method 26 then applies the propagation rules (in view of the topology, if necessary) for the managed object in an alarmed state (network element 14(2)) to identify related objects to that alarmed managed object. These managed objects are then collected together by the method in a set 30(2). The set 30(2) is then returned to the correlation engine 20 where an attempt is made to correlate that currently received set with other previously received sets (such as, for example, set 30(1)). It is then noted by the correlation engine 20 that the sets 30(1) and 30(2) share a managed object in common (as indicated by the "x" dot), or otherwise satisfy some defined merger test. The sets 30(1) and 30(2) are accordingly properly merged together to form a correlation set 32(1) (also referred to as a cluster). In this way, the alarms 28(1) and 28(2) are correlated together into a correlation set 32(1) containing not only the managed objects that are in the alarmed state but also the related managed objects to those alarmed objects. The indication here is that the alarms 28(1) and 28(2) in this one correlation set 32(1) have a relatively high probability (based on propagation characteristics and topology as well as historical context provided by previously generated sets 30 and correlation sets 32) that they are caused by the same network fault. Responsive thereto, the correlation engine 20 issues a correlation event 36 that identifies the change in the alarm context for the network 12.

Next, a third network element 14(3) issues an alarm 28(3) and the corresponding managed object for that network element is placed in an alarmed state (as indicated by the solid dot). Responsive to that alarm 28(3), the correlation engine 20 first checks to see if the managed object for the alarm 28(3) is a member of any existing sets 30 or correlation sets 32 (which it is, see correlation set 32(1)), and further if the member managed object is already in an alarmed state (which it is not). If not both (as is the case here), the correlation engine 20 invokes the build set method 26 of the set factory 18. The method 26 makes a request to the managed information tree repository 16 for the managed object based propagation rules as stored in the alarm propagation characteristics 24. A request may also be made, if necessary, for the stored network topology, 22 information. The build set method 26 then applies the propagation rules (in view of the topology, if necessary) for the managed object in an alarmed state (network element 14(3)) to identify related objects to that alarmed managed object. These managed objects are then collected together by the method in a set 30(3). The set 30(3) is then returned to the correlation engine 20 where an attempt is made to correlate that currently received set with other previously received sets (such as, for example, correlation set 32(1)). It is then noted by the correlation engine 20 that the set 30(3) and correlation set 32(1) share a managed object in common (as indicated by the "x" dot), or otherwise satisfy some defined merger test. The sets 30(3) and 32(1) are then merged together to form a correlation set 32(2) (also referred to as a cluster). In this way, the alarms 28(1), 28(2) and 28(3) are correlated together into a correlation set 32(2) containing not only the managed objects that are in the alarmed state but also the related managed objects to those alarmed objects. The indication here is that the alarms 28(1), 28(2) and 28(3) in one correlation set 32(2) have a relatively high probability (based on propagation characteristics and topology as well as historical context provided by previously generated sets 30 and correlation sets 32) that they are caused by the same network fault. Responsive thereto, the correlation engine 20 issues a correlation event 36 that identifies the change in the alarm context for the network 12.

Next, the previously alarmed (as indicated by the solid dot) network element 14(2) issues another alarm 28(4). Responsive to that alarm 28(4), the correlation engine 20 first checks to see if the managed object for the alarm 28(4) is a member of any existing sets 30 or correlation sets 32 (which it is, see correlation set 32(2)), and further if the member managed object is already in an alarmed state (which it is, see solid dot in correlation set 32(2)). If so (as is the case here), the correlation engine 20 notes the addition of the alarm to the historical context of that managed object (as indicated by the bulls-eye dot in correlation set 32(2)), but no further correlation engine processing is performed. Additionally, no new correlation event 36 need be issued unless requested by the network operator. In this context, it is assumed (based on the historical context provided by previously generated correlation set 32) that the alarms 28(1), 28(2), 28(3) and 28(4) in one correlation set 32(2) have a relatively high probability that they are caused by the same network fault. Processing of the alarm 28(4) in this manner in view of the historical context saves processing resources as the build set method is not invoked.

Although only one correlation set (cluster) 32 is illustrated as being in existence after completion of each correlation processing operation in the exemplary processing scenario recited above, it will be understood that the correlation engine 20 is capable of simultaneously handling multiple correlation sets 32. When such is the case, it is further understood that there exists a relatively high probability that the plural correlation sets 32 relate to corresponding plural (i.e., different) network faults. The existence of multiple correlation sets 32 does not change the manner as described above with which the correlation engine responds to new alarms 28 by building corresponding new sets 30 and attempting to merge those sets into the historical context defined by the existing correlation sets.

Following receipt and processing of a series of new alarm indications by the correlation engine 20, the engine will sometime in the future likely receive corresponding delete alarm indications as the alarmed state of the network elements 12 changes. The correlation engine 20 must process these delete alarm indications in an intelligent manner to update the correlation process by deleting existing sets 30 and modifying existing correlation sets 32 as necessary. When this occurs, the correlation engine 20 issues an appropriate correlation event 36 that identifies the change in the alarm context for the network 12. More specifically, when a delete alarm 50 indication is received concerning a specific managed object (network element 14), the correlation engine searches through its sets 30 and correlation sets (clusters) 32 to determine whether one of these sets contains that managed object in an alarmed state. If so, the set 30 containing that alarmed object is deleted (e.g., it is removed from its containing correlation set 32). A correlation event 36 that identifies the change in the alarm context for the network 12 resulting from that deletion in then issued by the correlation engine. In the situation where more than one alarm has been previously added to a particular managed object (i.e., the corresponding network element 14 has issued more than one alarm 28), the set 30 is not immediately deleted, but rather one of the included alarms is subtracted from the managed object. It is only when only one alarm is noted for a managed object that a subsequent delete alarm 50 received by the correlation engine results in the deletion of the set 30. When all sets 30 are deleted from a correlation set (cluster) 32, that correlation set is also deleted.

The operation of the correlation system 10 may be better understood by continued reference to the specific example utilizing the contextual framework of the exemplary network 12 illustrated in FIG. 1 to handle a plurality of corresponding delete alarm indications as shown in FIG. 2. The first network element 14(1), previously in an alarmed state, issues a delete alarm 50(1) and the corresponding managed object for that network element is removed from an alarmed state (as indicated by the open dot). Responsive to that delete alarm 50(1), the correlation engine 20 searches through the existing sets 30 and/or correlation sets 32 to determine whether there is an existing set 30 having the same managed object noted in an alarmed state (i.e., as would be indicated by a solid/bulls-eye dot). Such a set 30(1) is found within the correlation set 32(2) The correlation engine 20 then removes the set 30(1) to produce a correlation set 32(3). The correlation engine 20 then issues a correlation event 36 that identifies the change in the alarm context for the network 12.

Next, the third network element 14(3), previously in an alarmed state, issues a delete alarm 50(2) and the corresponding managed object for that network element is removed from an alarmed state (as indicated by the open dot). Responsive to that delete alarm 50(2), the correlation engine 20 searches through the existing sets 30 and/or correlation sets 32 to determine whether there is an existing set 30 having the same managed object noted in an alarmed state (i.e., as would be indicated by a solid/bulls-eye dot). Such a set 30(3) is found within the correlation set 32(3). The correlation engine 20 then removes the set 30(3) to produce a correlation set 32(4). The correlation engine 20 then issues a correlation event 36 that identifies the change in the alarm context for the network 12.

Next, the second network element 14(2) issues a delete alarm 50(3). It is noted here that because two alarms 28 were previously issued by this network element, the corresponding managed object for that network element remains in an alarmed state (as indicated by the solid dot). Responsive to that delete alarm 50(3), the correlation engine 20 searches through the existing sets 30 and/or correlation sets 32 to determine whether there is an existing set 30 having the same managed object noted in an alarmed state (i.e., as would be indicated by a solid/bulls-eye dot). Such a set 30(2) is found within the correlation set 32(4). The correlation engine 20 notes that multiple alarms were previously correlation with respect to that managed object, and subtracts one alarm in order to update the historical context. The set 30(2) is not, however, removed from the correlation set 32(4) because the subtraction does not result in an indication of zero remaining alarms. A revised correlation set 32(5), however, is issued indicating (with the solid dot as opposed to bulls-eye dot) that not all previous alarms 28 have been matched with a corresponding delete alarm 50. If desired, the correlation engine 20 may then issue a correlation event 36 that identifies the change in the alarm context for the network 12.

Next, the second network element 14(2), previously in an alarmed state, issues a delete alarm 50(4) and the corresponding managed object for that network element is removed from an alarmed state (as indicated by the open dot). Responsive to that delete alarm 50(4), the correlation engine 20 searches through the existing sets 30 and/or correlation sets 32 to determine whether there is an existing set 30 having the same managed object noted in an alarmed state (i.e., as would be indicated by a solid/bulls-eye dot). Such a set 30(2) is found within the correlation set 32(5). The correlation engine 20 then removes the set 30(2), and because the correlation set as a result contains no more sets 30 it is also deleted. The correlation engine 20 then issues a correlation event 36 that identifies the change in the alarm context for the network 12.

Reference is now made to FIG. 3 wherein there is shown a flow diagram illustrating a build set method implemented by the correlation engine of FIG. 1. In step 100, the build set method responds to being invoked (by the correlation engine) with respect to a new received alarm relating to a certain network element (managed object) by first retrieving the alarm propagation rules (and also network topology information, if necessary) relating to that managed object. The rules (and topology, if necessary) are then applied in step 102 to identify the managed objects that are related to the managed object in the alarmed state. The managed object in the alarmed state, along with its related objects, are then collected in accordance with the topology to create a set in step 104. The created set is then returned to the correlation engine in step 106.

Reference is now made to FIG. 4 wherein there is shown a flow diagram illustrating a new alarm indication processing method implemented by the correlation engine of FIG. 1. Responsive to a new alarm generated by a network element, the correlation engine determines in step 110 whether an existing correlation set (cluster) includes the managed object corresponding to that network element. If yes, the engine determines in step 112 whether that included managed object is already in the alarmed state. If yes to both steps 110 and 112, the alarm is added to the managed object within that correlation set in step 114 and the process ends further handling of that new alarm. If no in either step 110 or step 112, the correlation engine invokes the build set method (see, FIG. 3) in step 116. Once the set is built and returned, the correlation engine tries to match this returned set against previously created sets or correlation sets in step 118. Matching in this sense could involve checking to see whether the set/cluster or cluster/cluster share a managed object in common. Other matching rules could be defined by the network operator for application in step 118. The result of this matching operation would comprise adding (step 120) that returned set to the matched set or correlation set to create new or larger correlation sets. As a practical matter, the returned set may be inserted by the engine to a correlation set (cluster) containing just a single set, and then the result of the matching operation would be to merge (step 120) the two correlation sets (clusters) into one larger correlation set. Responsive to this action, the engine issues a correlation event in step 122 that identifies the change in the alarm context for the network. It is accordingly understood that the process of FIG. 4 relates to an event driven procedure for correlation wherein each new received alarm comprises an event to be handled with a correlation action.

Reference is now made to FIG. 5 wherein there is shown a flow diagram illustrating a delete alarm indication processing method implemented by the correlation engine of FIG. 1 and 2. Responsive to a delete alarm generated by a network element, the correlation engine tries to find in step 130 an existing set in a correlation set (cluster) having a managed object corresponding to that network element which is in an alarmed state. Once found, the set which contains that managed object in the alarmed state is removed in step 132 from the correlation set. The engine then issues a correlation event in step 134 that identifies the change in the alarm context for the network. It is accordingly understood that the process of FIG. 5 relates to an event driven procedure for correlation wherein each new received delete alarm comprises an event to be handled with a correlation action.

The action taken by the correlation engine in step 132 to remove a set 30 from a correlation set 32 in response to a delete alarm may necessitate the issuance of multiple correlation events in step 134. This may occur, for example, in a situation where the step 132 operation to delete a set results in having two currently uncorrelated sets 30 present within a single correlation set 32. Take the previously examined exemplary handling of alarms to generate the correlation set 32(2) where the set 30(2) is the product of two alarms 28(2) and 28(4). If the first delete alarm indications that are received originate from network element 14(2), the process of step 132 will result in the deletion of set 30(2) leaving sets 30(1) and 30(3). As these sets do not share a managed object in common (see, FIG. 4 step 118), they cannot be properly merged and the correlation engine must split the sets 30(1) and 30(3) into two correlation sets 32. As a result of this splitting, two corresponding correlation events should be issued in step 134.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A fault management system serving a network containing a plurality of network elements, comprising:

a database storing alarm propagation rules for the plurality of network elements;

a factory operating to apply the alarm propagation rules with respect to an indication of a certain one of the network elements being in an alarmed state to build a set containing not only that certain network element but also network elements related thereto by alarm propagation considerations; and a correlator having an historical context containing sets previously built by the set factory for previously handled alarms and responding to a current alarm to cause the factory to build a new set, merge the new set with one of the previously built sets in the historical context if there exists a likelihood that the current alarm and the previously handled alarm are caused by the same network fault.

2. The system as in claim 1 wherein the correlator responds to the current alarm by first determining in connection with the historical context whether the network element for that alarm is a member in an alarmed state of any of the sets previously built by the set factory for previously handled alarms, and if so adding the current alarm to the historical context and skipping the building of a new set.

3. The system as in claim 1 wherein the correlator merges sets into the historical context if a network element is shared in common between the new set for the current alarm and a previously built set relating to a previously handled alarm.

4. The system as in claim 1 wherein the correlator merges sets into the historical context if a network element in the new set for the current alarm and a network element for a previously built set relating to a previously handled alarm meet some specified correlation relationship.

5. The system as in claim 4 wherein the specified correlation relationship is defined by an operator of the network.

6. The system as in claim 1 wherein the correlator operates in an event driven manner to respond on an alarm-by-alarm basis to new alarms by creating a new set and merging the new set into the historical context of previous sets.

7. A method for alarm correlation with respect to an historical context containing sets previously built for previously handled alarms, each set containing not only a network element in an alarmed state but also network elements related to that network element by alarm propagation considerations, the method comprising the steps of:

receiving a current alarm from a certain network element;

building a new set for that current alarm containing not only that certain network element but also other network elements related thereto by alarm propagation considerations; and merging the new set with one of the previously built sets in the historical context if there exists a likelihood that the current alarm and the previously handled alarm are caused by the same network fault.

8. The method of claim 7 further comprising the step of repeating the steps of claim 7 on an event driven alarm-by-alarm basis for each newly received alarm.

9. The method of claim 7 wherein the step of receiving comprises the steps of:

determining in connection with the historical context whether the certain network element is a member in an alarmed state of any of the previously built sets of the historical context; and if so, adding the current alarm to the historical context and skipping the remaining steps of claim 7 for that current alarm.

10. The method as in claim 7 wherein the step of merging comprises the step of merging the new set into the historical context if a network element is shared in common between the new set for the current alarm and a previously built set relating to a previously handled alarm.

11. The method as in claim 7 wherein the step of merging comprises the step of merging the new set into the historical context if a network element in the new set for the current alarm and a network element for a previously built set relating to a previously handled alarm meet some specified correlation relationship.

12. The method as in claim 11 wherein the specified correlation relationship is defined by an operator of a network being managed by the alarm correlation method.

* * * * *